US012672610B2

(12) United States Patent
Ostermann et al.

(10) Patent No.:    US 12,672,610 B2
(45) Date of Patent:        Jul. 7, 2026

(54) BALER SYSTEM AND A METHOD OF OPERATING THE BALER SYSTEM

(71) Applicant: DEERE & COMPANY, Moline, IL (US)

(72) Inventors: Philippe Ostermann, Dijon (FR); Pierre Dommange, Maizieres les Metz (FR); Benedikt Jung, Kaiserslautern (DE)

(73) Assignee: Deere & Company, Moline, IL (US)

( * ) Notice: Subject to any disclaimer, the term of this patent is extended or adjusted under 35 U.S.C. 154(b) by 664 days.

(21) Appl. No.: 18/160,550

(22) Filed: Jan. 27, 2023

(65) Prior Publication Data

US 2023/0354751 A1     Nov. 9, 2023

(30) Foreign Application Priority Data

May 4, 2022    (DE) ......................... 102022111005.2
May 4, 2022    (DE) ......................... 102022111006.0

(51) Int. Cl.
A01F 15/08        (2006.01)
A01B 69/04        (2006.01)
(Continued)

(52) U.S. Cl.
CPC ........ A01F 15/0833 (2013.01); A01B 69/008 (2013.01); A01F 15/071 (2013.01);
(Continued)

(58) Field of Classification Search
CPC .... A01F 15/0833; A01F 15/071; A01F 15/08; A01F 15/0883; A01B 69/008; G05D 1/0223
(Continued)

(56) References Cited

U.S. PATENT DOCUMENTS 4,924,405 A * 5/1990 Strosser .............. A01F 15/0833
                                                                    702/158
5,551,218 A * 9/1996 Henderson ............ A01F 15/141
                                                                    100/88
(Continued)

FOREIGN PATENT DOCUMENTS

EP          1683407 A1      7/2006
EP          1813146 B1      6/2009
(Continued)

OTHER PUBLICATIONS

Extended European Search Report and Written Opinion issued in European Patent Application No. 23169344.1, dated Oct. 10, 2023, in 07 pages.

(Continued)

*Primary Examiner* — Tuan C To
*Assistant Examiner* — Dominick Mulder

(57)                ABSTRACT

A combination of a tractor and a baler includes a tractor control unit and a baler control unit. A driving speed of the tractor can be set and/or adjusted with the tractor control unit. The baler includes a bale sensor in order to sense the size of a bale in a baling chamber. The baler control unit is connected to the bale sensor and to the tractor control unit to send a stop signal to the tractor control unit when the bale signal of the bale sensor indicates that a bale has reached a size which is greater than or equal to a first predetermined size. The tractor control unit controls the tractor to initiate a braking operation for stopping the tractor and to adapt a driving rotational speed of the drive shaft of the baler when the tractor control unit receives the stop signal from the baler control unit.

11 Claims, 3 Drawing Sheets

(51) Int. Cl.
    *A01F 15/07*        (2006.01)
    *G05D 1/00*        (2006.01)

(52) U.S. Cl.
    CPC .......... *A01F 15/08* (2013.01); *A01F 15/0883*
              (2013.01); *G05D 1/0223* (2013.01)

(58) Field of Classification Search
    USPC ........................................................ 701/50
    See application file for complete search history.

(56) References Cited

U.S. PATENT DOCUMENTS

| | | | | |
|---|---|---|---|---|
| 7,404,355 | B2 * | 7/2008 | Viaud .................. | A01B 69/001 |
| | | | | 100/4 |
| 7,937,923 | B2 * | 5/2011 | Biziorek ............. | A01F 15/0715 |
| | | | | 56/343 |
| 8,527,156 | B2 * | 9/2013 | Martin ................... | A01F 15/08 |
| | | | | 701/1 |
| 2001/0018821 | A1 * | 9/2001 | Chow ................... | A01F 15/141 |
| | | | | 53/589 |
| 2002/0029542 | A1 * | 3/2002 | Davis ................. | A01F 15/0715 |
| | | | | 53/64 |
| 2007/0175198 | A1 * | 8/2007 | Viaud .................. | A01B 69/001 |
| | | | | 56/341 |
| 2009/0107102 | A1 * | 4/2009 | Biziorek ............. | A01F 15/0883 |
| | | | | 56/341 |
| 2009/0255775 | A1 * | 10/2009 | Viaud .................... | A01F 21/00 |
| | | | | 192/135 |
| 2011/0023732 | A1 | 2/2011 | Herron | |
| 2011/0060507 | A1 * | 3/2011 | Vanhercke ........... | A01F 15/085 |
| | | | | 701/50 |
| 2013/0116895 | A1 * | 5/2013 | Smith .................... | F16H 61/70 |
| | | | | 701/50 |
| 2014/0020352 | A1 * | 1/2014 | Smith .................... | A01F 15/08 |
| | | | | 475/198 |
| 2014/0261023 | A1 * | 9/2014 | Smith ................. | A01F 15/0833 |
| | | | | 100/45 |
| 2014/0345481 | A1 * | 11/2014 | Olander .............. | A01F 15/0705 |
| | | | | 100/45 |
| 2014/0373737 | A1 * | 12/2014 | Olander .............. | A01F 15/0833 |
| | | | | 100/43 |
| 2016/0143225 | A1 * | 5/2016 | Smith ................... | A01F 15/141 |
| | | | | 701/50 |
| 2016/0235007 | A1 * | 8/2016 | Hoffmann ............ | A01F 15/106 |
| 2020/0205336 | A1 * | 7/2020 | Boone ................. | A01B 69/004 |
| 2020/0214219 | A1 * | 7/2020 | Lebeau ................... | B65B 57/04 |
| 2021/0084825 | A1 * | 3/2021 | Kurata ............... | A01F 15/0833 |
| 2021/0191408 | A1 * | 6/2021 | Hayashida ............ | G05D 1/648 |
| 2022/0346324 | A1 * | 11/2022 | Casadei .............. | A01F 15/0883 |
| 2023/0115928 | A1 * | 4/2023 | Hoffmann ............. | A01B 67/00 |
| | | | | 701/50 |

FOREIGN PATENT DOCUMENTS

| | | | |
|---|---|---|---|
| EP | 2526759 | A1 | 11/2012 |
| EP | 2745674 | B1 | 11/2015 |
| EP | 3025578 | B1 | 10/2019 |
| WO | WO2011012955 | A1 | 2/2011 |

OTHER PUBLICATIONS

Extended European Search Report and Written Opinion issued in European Patent Application No. 23169345.8, dated Oct. 10, 2023, in 08 pages.

\* cited by examiner

BALER SYSTEM AND A METHOD OF OPERATING THE BALER SYSTEM

CROSS-REFERENCE TO RELATED APPLICATIONS

This application claims priority to and the benefit of German Patent Application No. 102022111005.2, filed on May 4, 2022, and German Patent Application No. 102022111006.0 filed on May 4, 2022, the disclosures of which are hereby incorporated by reference.

TECHNICAL FIELD

The disclosure generally relates to a baler system including a tractor and a baler implement, and a method of operating the baler system.

BACKGROUND

Balers, in particular round balers, are used for picking up and compressing agricultural crop, for example straw, hay or the like. The harvested crop lying on the ground is picked up in this case with a pick-up unit, in particular a pick-up. The picked-up crop is conducted with a conveying unit, for example a rotor or a conveying unit, into a baling chamber having one or more compression means. The conveying unit can be designed as part of the pick-up unit or arranged downstream of the pick-up unit, in particular arranged downstream in the conveying direction. The bale, in particular the round bale, is formed in the baling chamber. The shaped and finished bale is subsequently wrapped in the baling chamber with a wrapping material, for example mesh, film or binding twine, and can be unloaded preferably via a discharge flap or a rear part of the baler, in particular via the baling chamber which is provided with a discharge flap or a rear part. In order, however, to be able to bind or wrap the bale, the supply of crop to the baling chamber has to be stopped, which is only possible, in the case of conventional balers, by interrupting the picking-up of crop. This means that the driver of the tractor and baler implement has to continuously monitor the baling operation or the parameters provided by the baler, for example the bale size, in order to stop or to start the tractor accordingly. It is proposed in EP 1813146 A2 to solve this problem by a connection of a baler control unit, which is connected to a bale sensor, i.e. to a sensor sensing the size of the bale, to a tractor control unit which transmits a stop signal at a predetermined size of the bale such that the tractor stops or halts, in particular automatically stops or halts. The automatic control and/or regulation of this operation relieves the strain on the driver. EP 2526759 B1 discloses adapting the rotational speed of a drive shaft of the baler in order to shorten the stoppage times of the tractor. In this case, the tractor control unit is provided by the baler control unit with a rotational-speed desired value signal depending on the various wrapping phases in the baling chamber of the baler, whereupon the rotational speed of the drive shaft of the baler is adapted by means of the tractor control unit.

One disadvantage in this connection is the long stoppage times of the combination of the tractor and baler implement since it is not possible for any crop to be compressed in all of the wrapping phases. Another disadvantage is that the adaptation of the driving rotational speed of the drive shaft is coupled to the wrapping operation, in particular the wrapping phases, which leads to a loss of time during the wrapping operation.

SUMMARY

According to the disclosure, a combination of a tractor and a baler implement is proposed. The baler implement may alternatively be referred to as the baler. The tractor includes a drive motor which is connected, preferably driveably connected and/or mechanically coupled, to a drive shaft of the baler. The combination includes a tractor control unit and a baler control unit, preferably the tractor includes the tractor control unit and the baler includes the baler control unit. A driving speed of the tractor can be set and/or adjusted, in particular controlled and/or regulated, with the tractor control unit. The baler is connected, and/or in particular coupled, to the tractor. The baler includes: a pick-up unit for picking up crop; a baling chamber in order to compress the picked-up crop to form a bale, in particular a round bale; and a bale sensor in order to sense, for example to detect, the size of a bale, i.e. in particular a bale size, in the baling chamber.

The baler control unit is connected to the bale sensor and to the tractor control unit, in particular in signal-exchanging fashion. The baler control unit can be operated in such a manner that in particular the baler control unit receives the size of the bale in the form of a bale signal from the bale sensor and the baler control unit sends a stop signal to the tractor control unit when the bale signal of the bale sensor indicates that a bale has reached a size which is greater than or equal to a first predetermined size, i.e. in particular greater than or equal to a first predetermined bale size. In other words, the baler control unit can be operated in such a manner that the baler control unit sends a stop signal to the tractor control unit when the baler control unit determines, in particular calculates, by means of the bale signal received by the bale sensor, that a bale has reached a size which is greater than or equal to the first predetermined size. Specifically, the baler control unit can be operated in the following manner. The baler control unit receives the bale signal from the bale sensor. The baler control unit calculates and/or checks by way of the bale signal, whether a bale has reached a size which is greater than or equal to the first predetermined size. When the baler control unit establishes that the bale has reached a size which is greater than or equal to the first predetermined size, the baler control unit sends a stop signal to the tractor control unit. In addition, the tractor control unit can be operated in particular so as preferably to instruct the tractor, particularly preferably to automatically instruct the tractor, to initiate a braking operation for stopping the tractor, in particular the combination, and to adapt, particularly to automatically adapt, a driving rotational speed of the drive shaft of the baler when the tractor control unit receives the stop signal from the baler control unit. In other words, the tractor control unit can be operable to the effect that the tractor has to be stopped, in particular has to be automatically stopped, and a driving rotational speed of the drive shaft of the baler has to be adapted, in particular has to be automatically adapted, when the tractor control unit receives the stop signal from the baler control unit. The expression which is used "to adapt a driving rotational speed of the drive shaft of the baler" can be understood in this connection not as meaning switching the drive shaft on and off, but rather increasing or reducing the driving rotational speed of the drive shaft.

The tractor can be an agricultural tractor, in particular a tractor or a hauler. The tractor can be arranged in a direction of travel in front of the baler. The tractor can pull the baler. The tractor can also comprise steering means for steering the tractor. The tractor can be driven by the drive motor, for example an internal combustion engine or an electric motor. In addition, the drive motor is connected, in particular driveably connected and/or mechanically coupled, to the drive shaft. As a result, the drive motor can transmit a rotational speed and/or a torque to the baler via the drive shaft. The baling chamber and/or the wrapping device and/or the pick-up unit and/or a conveying unit can be driveable, in particular, the driving rotational speed and/or a torque of the drive shaft can be transmittable thereto, via the drive shaft. The baler can be connected, in particular coupled, to the tractor via the drive shaft and/or via a towing device, for example a drawbar and/or a coupling. For example, a frame of the tractor can be connected to a frame of the baler via the or with the towing device. The tractor can comprise the tractor frame. In addition, the tractor can comprise one or more ground engagement means. The ground engagement means can support and/or carry the tractor on the ground. The ground engagement means can be wheels or tracks or chains. The ground engagement means can be connected, in particular driveably connected and/or mechanically coupled, to the drive motor directly or via a drive train. The ground engagement means can thus be driveable by the drive motor, such that the tractor, for example, can be driven in a forwards and/or backwards direction over a field. The driving speed of the tractor can be set and/or adjusted, in particular controlled and/or regulated, with the tractor control unit. In other words, the tractor control unit can be operable in order to set and/or adjust, in particular control and/or regulate, the driving speed of the tractor. Specifically, the tractor control unit can be operable in order to set and/or adjust, in particular to control and/or regulate, the drive motor and/or the drive train, in particular a transmission, and/or the ground engagement means. Preferably, the tractor control unit can be operable to set and/or adjust, in particular to control and/or regulate, the driving speed of the tractor with the drive motor and/or the drive train and/or the ground engagement means. Particularly preferably, the tractor control unit can be operable to stop the tractor when the tractor control unit receives the stop signal from the baler control unit, by the tractor control unit setting and/or adjusting, in particular controlling and/or regulating, the driving speed of the tractor with the drive motor and/or the drive train and/or the ground engagement means. The tractor control unit can be connected to the drive train, in particular in signal-exchanging fashion. Specifically, the tractor control unit can be operable for the setting and/or adjusting, in particular controlling and/or regulating, the driving speed of the ground engagement means. Equally, the tractor control unit can instruct the ground engagement means to stop the tractor, preferably to stop it automatically, when the tractor control unit receives a stop signal from the baler control unit. The stop signal can indicate that no additional crop can be introduced into the baling chamber. With the tractor control unit, a first driving speed of the tractor can be settable and/or adjustable in a baling phase, i.e. in particular when crop is supplied to the baler via the pick-up unit. In addition, in a stopping phase, i.e. in particular when the tractor control unit receives or has received the stop signal from the baler control unit, the driving speed of the tractor can be settable and/or adjustable to 0 km/h by the tractor control unit. The first driving speed can preferably be >8 km/h, particularly preferably >4 km/h. The driving speed in the stopping phase can be reduced to 0 km/h. The stopping of the combination and the adaptation of the driving rotational speed of the drive shaft can take place simultaneously or successively, but in particular takes place in the stopping phase. Driveably connected and/or mechanically coupled can be understood below as meaning a driveable connection and/or a mechanical coupling of two components of the combination, which makes it possible to transmit a force or a rotational speed or a torque from the one component to the other mechanically. Between the two components, further components permitting such a transmission of force or moment, in particular transmission of torque, between the two components can be provided here.

The baler can be a square baler or a round baler for forming round bales of crop. The baler can comprise the baler frame. The baler can also be integrated in the tractor, i.e. the combination can be designed as a self-propelling baler. The baling chamber can compress crop picked up by the pick-up unit to form a bale, in particular to form a round bale. The baler can be designed with a size-variable baling chamber or as a baler with a variable baling chamber. The baler with a size-variable baling chamber can comprise one or more compression means, wherein the compression means can be designed in particular as a belt or strap or chain arrangement or band. The baler can equally also comprise a size-invariable baling chamber. In this case, a compression means can be designed as a compression roller, in particular a multiplicity of compression rollers running parallel to one another, for compressing the crop. The axes of rotation of the compression rollers can lie on an arc of a circle when the discharge flap is closed and at least one of the compression rollers can be driven. The arrangement of the compression rollers in the baling chamber can correspond to a cylindrical shape, and therefore the compression rollers are arranged cylindrically around the round bale and form a cylindrical circumferential surface. The baling chamber can be arranged on the baler frame, preferably connected to the latter and/or fastened to the latter. The pick-up unit for picking up or for collecting crop lying or standing in a field, and/or for conveying the crop into the baling chamber, can likewise be arranged on the baler frame, preferably connected to the latter and/or fastened to the latter. The baler control unit can be arranged on the baler or on the tractor.

The bale sensor can be arranged on or in the baling chamber in such a manner that the bale sensor can sense a size of the bale, i.e. a bale size. The bale sensor can also be assigned to the baling chamber, in particular can be arranged and/or fastened on/to or inside or outside the baling chamber. The bale sensor can sense a size of the bale in the baling chamber and in particular can convert it into the bale signal. The bale signal can therefore be representative of the size of the bale in the baling chamber, for example the bale sensor can sense the distance from the bale surface or from the compression means lying on the bale surface. The bale sensor can thus provide information about the size of the bale, in particular can provide the bale diameter at the respective location along the bale width. The bale sensor can send the bale signal to the baler control unit. The baler control unit can receive the bale signal from the bale sensor. On the basis of the bale signal or with the bale signal, the baler control unit can determine and/or ascertain, in particular calculate and/or compare, whether a bale has reached a size which is greater than or equal to the first predetermined size, i.e. is greater than or equal to a first predetermined bale size. The baler control unit sends a stop signal to the tractor control unit when a bale has reached a size which is greater than or equal to the first predetermined size.

The combination described herein is operable to adapt the driving rotational speed of the drive shaft when a first predetermined size of the bale has been reached. Stop signal and bale signal can be identical or different signals. The tractor control unit initiates a braking operation for stopping or halting the tractor and adapts a driving rotational speed of the drive shaft of the baler, for example by the tractor control unit initiating the transmission block to adapt the driving rotational speed of the drive shaft. The tractor control unit can initiate the tractor and therefore the combination to stop and to adapt the driving rotational speed of the drive shaft without an operator intervention being required. In other words, by means of the disclosure, a combination of a tractor and a baler is provided, wherein the tractor control unit can be operated in such a manner that the tractor stops, in particular stops automatically, and the driving rotational speed of the drive shaft adapts, in particular automatically, when the tractor control unit receives the stop signal from the baler control unit. Automatically can be understood as meaning that no operator intervention is required. In this way, the work of the operator of the combination is facilitated since the operator does not have to observe a monitor or a display which indicates to the operator to stop the tractor. In addition, the production of bales which are larger than desired is advantageously avoided. The time saving by simultaneously halting the combination and adapting the driving rotational speed of the drive shaft is a considerable advantage of the combination according to the disclosure. In an advantageous manner, in the time in which the combination is halted or stopped, the driving rotational speed of the drive shaft can thus be adapted such that the driving rotational speed is adapted before the beginning or start of the binding or wrapping operation, i.e. in particular in the stopping phase, and thus independently of the binding or wrapping operation. At the same time, by halting of the tractor, it is advantageously avoided that further crop is picked up into the baler. It is therefore an advantage that the adaptation of the driving rotational speed of the drive shaft takes place at the same time as the stopping operation and is adapted before the beginning or start of the binding or wrapping operation, i.e. in the stopping phase, since the resulting time for the halting and wrapping is thereby considerably reduced.

In a refinement of the disclosure, the tractor control unit can be operated to initiate an increase or reduction in the driving rotational speed of the drive shaft when the tractor control unit receives the stop signal from the baler control unit. In other words, specifically, before the start of the actual binding or wrapping operation, the driving rotational speed can be increased or reduced such that the adapted driving rotational speed is already available at the beginning of the binding or wrapping operation. The driving rotational speed of the drive shaft can be settable and/or adjustable, in particular controllable and/or regulable, independently of a rotational speed, in particular motor rotational speed, of the drive motor. There are various possibilities for increasing or reducing the drive shaft rotational speed. Conventionally, the rotational speed of the drive shaft can be shifted in stages (540 rpm and 1000 rpm) via a multiplication transmission of the tractor. Equally, the tractor can comprise a continuously regulated power-take-off drive which can be regulated independently of the rotational speed of the drive motor. A substantial advantage of this design is the time saving. By halting the combination and increasing the driving rotational speed, in particular during the stopping operation of the combination, the entire operation of halting and of increasing the driving rotational speed can be carried out before the actual binding or wrapping operation. As a result, the entire time sequence of the baler is reduced, and this in turn increases the daily output of the baler and saves costs. As an additional secondary effect, by increasing the driving rotational speed even before the actual binding or wrapping operation, the bale can be wrapped more rapidly and therefore also discharged more rapidly from the baling chamber.

In a refinement of the disclosure, the tractor is steerable with the tractor control unit. In other words, the tractor control unit can be operated in such a manner that the tractor is steerable with the tractor control unit. The tractor can comprise a steering device for steering the tractor. The tractor control unit can be operable in order to set and/or to adjust, in particular to control and/or to regulate, the steering device. Specifically, the tractor control unit can steer the tractor in such a manner that the swath enters alternately in the vicinity of the left and right end of the pick-up unit. The tractor control unit can in particular take into consideration the width of the swath and the width of the baling chamber. The tractor can therefore also be steered in such a manner that the actual position of the combination or of the tractor, which is supplied from a GPS antenna, and the position of the swath in the memory coincide. Steering data could also be calculated by the tractor control unit or by a separate steering control unit. For this purpose, for example, the tractor control unit can be designed as a steering control unit. Specifically, the combination, in particular the tractor, can also be connected via an electromagnetic valve arrangement to a steering cylinder which sets and/or adjusts, in particular controls and regulates, the steering angle of the front axle and/or of the front wheels.

In a refinement of the disclosure, the combination includes a swath sensor and the tractor control unit can be operated to steer the tractor, in particular automatically, along the swath on the basis of the signals of the swath sensor, such that in particular a uniform bale shape is obtained. The swath sensor can be connected to the tractor control unit and/or to the baler control unit. The tractor and/or the baler can comprise the swath sensor. The swath sensor can be arranged on the tractor and/or on the baler, in particular can be connected and/or fastened to them. As a result, the tractor control unit can steer the combination, in particular the tractor, along a swath on the basis of the signal of the swath sensor. The swath sensor can measure the lateral distance from the vertical borders or edges of the swath, for example by using ultrasound. Equally, the swath sensor can comprise a camera. The camera can be directed at the swath. In addition, the camera can be connected to the tractor control unit and/or to the baler control unit. As a result, the camera of the tractor control unit can supply a video signal which is processed in an image processing system provided inside or outside the tractor control unit. Equally, with the image processing system, an electronic display about the position of the tractor with respect to the swath can be provided. Specifically, the tractor control unit can be operable to steer the tractor, in particular automatically, along the swath on the basis of the signals of the swath sensor and the bale signal of the bale sensor such that a uniform bale shape is obtained. The tractor control can thereby steer the combination, in particular the tractor, along the swath on the basis of the signal of the swath sensor and the bale signal and at the same time a uniform bale shape and density can be obtained. In addition, the crop present in the form of swath can be picked up more completely from the ground.

In a refinement of the disclosure, the baler control unit can be operated in such a manner that the baler control unit sends a deceleration signal to the tractor control unit when the bale signal of the bale sensor indicates that a bale has reached a size which is greater than or equal to a second predetermined size, i.e. greater than or equal to a second predetermined bale size. The second predetermined size is smaller than the first predetermined size. In other words, the baler control unit can be operated in such a manner that the baler control unit sends a deceleration signal to the tractor control unit when the baler control unit determines, in particular calculates, by means of the bale signal received by the bale sensor, that a bale has reached a size which is greater than or equal to a second predetermined size. Specifically, the baler control unit can be operated in the following manner. The baler control unit receives the bale signal from the bale sensor. The baler control unit calculates and/or checks by way of the bale signal whether a bale has reached a size which is greater than or equal to a second predetermined size. When the baler control unit establishes that the bale has reached a size which is greater than or equal to a second predetermined size, the baler control unit sends a deceleration signal to the tractor control unit. The tractor control unit can be operated, in particular to instruct the tractor to slow down when the tractor control unit receives the deceleration signal from the baler control unit. In other words, the tractor control unit can be operable to the effect of slowing down the tractor, in particular slowing it down automatically, when the tractor control unit receives the deceleration signal from the baler control unit. Therefore, in a deceleration phase, i.e., in particular when the tractor control unit receives or has received the deceleration signal from the baler control unit, a second driving speed of the tractor can be settable by the tractor control unit. It may be true here that the first driving speed in the baling phase is greater than the second driving speed in the deceleration phase. The second driving speed can preferably be $\geq 8$ km/h$>0$ km/h, particularly preferably $\geq 4$ km/h$>0$ km/h. Slowing down can therefore be understood as meaning that the driving speed is reduced from the first driving speed to the second driving speed during a baling phase. Specifically, the tractor control unit can be operable to instruct the drive motor and/or the drive train and/or the ground engagement means to slow down the tractor when the tractor control unit receives the deceleration signal from the baler control unit. Preferably, the tractor is braked or brought to a lower driving speed than during the compressing operation as soon as the bale has reached or exceeds the second predetermined size, which is somewhat smaller than the first predetermined size. The second predetermined size can be smaller (e.g. 10 cm in diameter smaller) than the first predetermined size. Specifically, the tractor control unit can be operable to slow down the tractor and to adapt a driving rotational speed of the drive shaft of the baler when the tractor control unit receives the deceleration signal from the baler control unit. The deceleration avoids an abrupt stopping or braking when the bale reaches the first size.

In a refinement of the disclosure, the baler includes a wrapping device for wrapping the finished bale with wrapping material in the baling chamber. The wrapping device can be operable at least to the effect that the wrapping material for wrapping the finished bale is dispensed into the baling chamber. The baler can comprise a wrapping sensor. The wrapping device and/or wrapping sensor can be connected to the baler control unit. The baler control unit can be operable to the effect of instructing the wrapping device to dispense the wrapping material when the tractor control unit instructs the baler control unit that the driving rotational speed of the drive shaft is adapted, in particular the increase or reduction in the driving rotational speed of the drive shaft is initiated or adapted. Equally, the baler control unit can be operable to the effect of instructing the wrapping device to dispense the wrapping material when the baler control unit receives a bale signal from the bale sensor that a bale has reached a size which is greater than or equal to the first predetermined size. Equally, the baler control unit can be operable to the effect of supplying the stop signal to the tractor control unit only when the wrapping sensor supplies the baler control unit with a wrapping signal which indicates that the wrapping material is being pulled by the bale. The wrapping signal therefore indicates that the wrapping material is being pulled by the bale after the baler control unit has instructed the wrapping device to dispense wrapping material. Upon instruction of the baler control unit, the wrapping device can discharge or dispense a twine, a mesh or a film to the bale. In addition, the baler control unit can be operable to produce an error signal if the wrapping sensor does not supply a wrapping signal to the baler control unit. By increasing the driving rotational speed of the drive shaft before the binding or wrapping operation, the entire binding wrapping operation is shortened and the bale is more rapidly discharged from the baling chamber. As a result, the entire time sequence of the baler is reduced, and this in turn increases the daily output of the baler and saves costs.

In a refinement of the disclosure, the tractor control unit can be operated in such a manner that the combination, in particular the tractor, is driveable at a speed, in particular a throughput speed, which produces a predetermined throughput of the pick-up unit of the baler. The tractor control unit can set and/or adjust, in particular control and regulate, the combination, in particular the tractor, in such a manner that the tractor is driveable, in particular automatically, at a driving speed which produces a desired or a predetermined throughput of the pick-up unit of the baler. Specifically, the tractor control unit can be operable to instruct the drive motor and/or the drive train and/or the ground engagement means to drive the tractor at the driving speed, in particular the throughput speed. The throughput can be measured by the torque being sensed at a power-take-off (PTO) of the tractor driving the baler and/or of the drive shaft, or with a recording sensor which senses the thickness of a crop layer picked up by the baler, or with a torque sensor which measures the torque for driving the pick-up unit.

In one implementation, the combination, in particular the tractor, includes a GPS device, wherein position data can be sent and/or received and/or in particular calculated with the GPS device. The GPS device can comprise, for example, a GPS antenna and a memory. The position data can comprise in particular the position of the combination or of the tractor. The position of the swath, the position being known from previous processing operations of the swath, can be stored in the memory. The GPS device and the memory can be connected in particular to the tractor control unit, in particular in signal-exchanging fashion.

The disclosure further relates to a method for operating a combination of a tractor and a baler. The tractor includes a drive motor which is connected to a drive shaft of the baler. The combination includes a tractor control unit and a baler control unit, wherein a driving speed of the tractor is set and/or adjusted with the tractor control unit. The baler is connected to the tractor. The baler includes a pick-up unit for picking up crop, a baling chamber in which the picked-up crop is compressed to form a bale, and a bale sensor with which the size of a bale in the baling chamber is sensed. The baler control unit is connected to the bale sensor and to the tractor control unit. The baler control unit sends a stop signal to the tractor control unit when the bale signal of the bale sensor indicates that a bale has reached a size which is greater than or equal to a first predetermined size. Furthermore, the tractor control unit initiates a braking operation for stopping the tractor and adapts a driving rotational speed of the drive shaft of the baler when the tractor control unit receives the stop signal from the baler control unit. The method according to the disclosure can be carried out by the combination according to the disclosure and includes in particular the above-described embodiments of the combination. The method according to the disclosure has the above-described advantages of the combination.

The baler control unit and the tractor control unit can each be an electronic module and/or an embedded system and/or can each comprise a memory module and/or a processor. The baler control unit and the tractor control unit can also be designed, however, as a joint electronic module and/or a joint embedded system and/or can comprise a memory module and/or a processor. The baler control unit can be connected to the bale sensor and to the tractor control unit and/or to the pick-up unit and/or to the swath sensor and/or to the wrapping device and/or to the wrapping sensor and/or to a first and/or second actuator and/or to the recording sensor and/or to the torque sensor, preferably connected in signal-exchanging fashion and/or signal-transmitting fashion and/or in data-conducting fashion. The bale sensor and the tractor control unit and/or the swath sensor and/or the pick-up unit and/or the wrapping device and/or the wrapping sensor and/or the first and/or second actuator and/or the recording sensor and/or the torque sensor can be settable and/or adjustable, and/or preferably controllable and/or regulable, with the baler control unit. The tractor control unit can be connected to the baler control unit and/or to the swath sensor and/or to the drive motor and/or to the drive shaft and/or to the drive train and/or to the GPS device and/or to the steering means and/or to the first and/or second actuator and/or to the recording sensor and/or to the torque sensor, preferably connected in signal-exchanging fashion and/or signal-transmitting fashion and/or in data-conducting fashion. The baler control unit and/or the swath sensor and/or the drive motor and/or the drive shaft and/or the drive train and/or the GPS device and/or the steering means and/or the first and/or second actuator and/or the recording sensor and/or the torque sensor can be settable and/or adjustable, and/or preferably controllable and/or regulable, with the tractor control unit. The first and/or second actuator can be actuable with the tractor control unit and/or the baler control unit. A connection in signal-exchanging fashion and/or signal-transmitting fashion and/or data-conducting fashion should be understood here as meaning that signals are exchanged between the connected components. The signals are processed in the tractor control unit and/or in the baler control unit and thus serve for setting and/or adjusting, in particular for controlling and/or regulating and activating, the components which are connected to one another in signal-exchanging fashion and/or signal-transmitting fashion and/or data-conducting fashion. The connection can be implemented so as to be wired, i.e. in particular with cables, and/or wirelessly, i.e. by radio, for example using Bluetooth. The communications bus can be, for example Isobus, CAN-bus, or similar. Specifically, the connection can be formed via a BUS line, preferably in the form of an ISO-BUS line in accordance with the standard ISO 11783. The tractor control unit can be assigned to the tractor, and the baler control unit can be assigned to the baler. If the tractor control unit and the baler control unit are designed as one component, said component can be assigned either to the tractor or to the baler. The tractor control unit and/or the baler control unit can be connected to an input and output unit arranged in a cab of the tractor, preferably connected in signal-exchanging fashion and/or signal-transmitting fashion and/or data-conducting fashion. With the input and output unit, data input by an operator can be transmitted to the tractor control unit and/or to the baler control unit or received and output by same. However, it is also conceivable for the tractor control unit and/or the baler control unit to be connected indirectly to the input and output unit by a master controller unit.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "includes," "includes," and like phrases are intended to specify the presence of stated features, steps, operations, elements, and/or components, but do not preclude the presence or addition of one or more other features, steps, operations, elements, components, and/or groups thereof.

Figure 1:
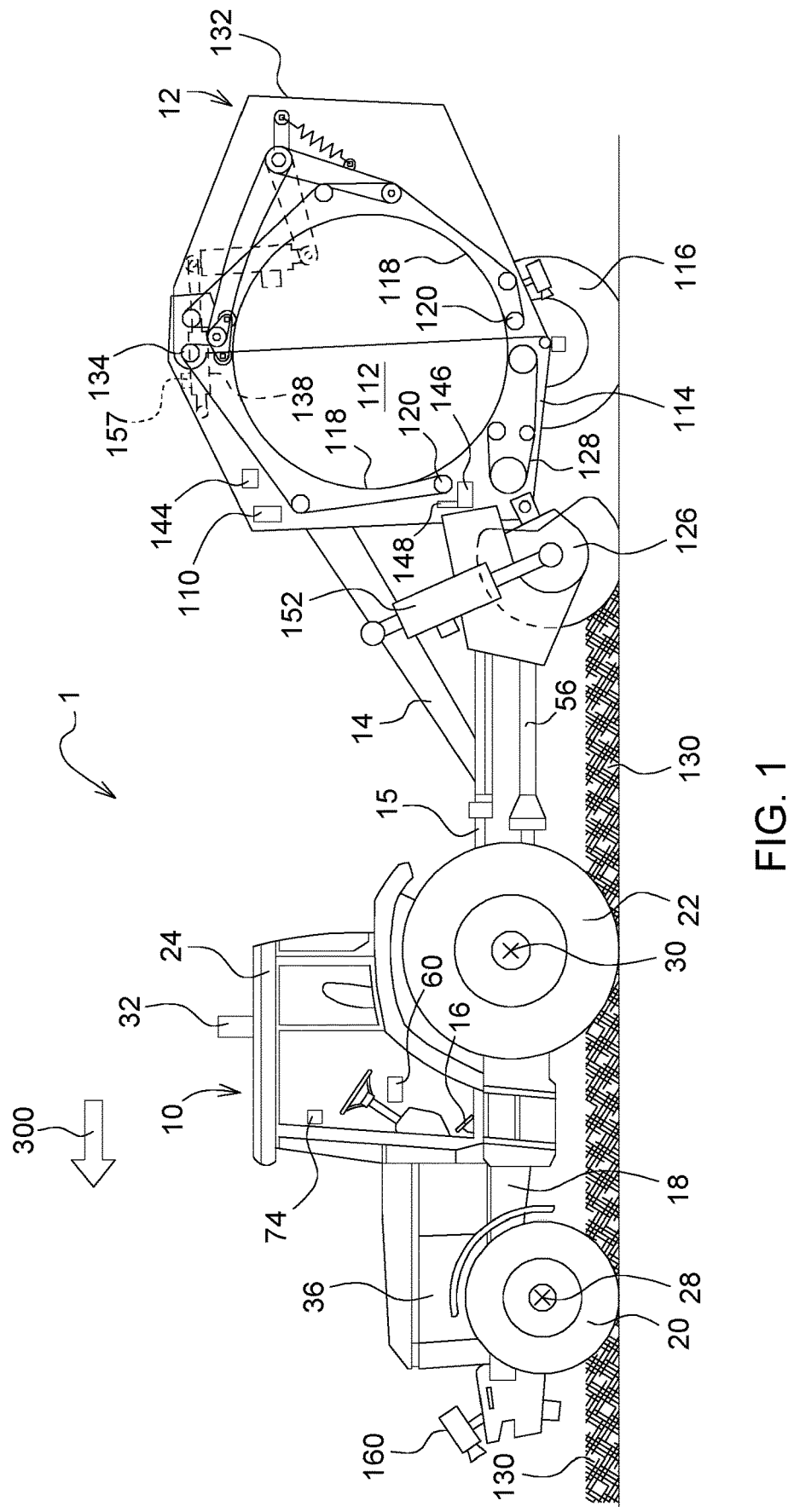
FIG. 1 is a schematic illustration of a first exemplary implementation of a combination according to the disclosure of a tractor and a baler.

Referring to the Figures, wherein like numerals indicate like parts throughout the several views, FIG. 1 shows a schematic illustration of a first exemplary embodiment of a combination 1 according to the disclosure of a tractor 10 and a baler 12. The tractor 10 comprises a drive motor 36, which is connected to a drive shaft 56 of the baler 12, and a tractor control unit 60. The drive motor 36 can be designed as an internal combustion engine or as an electric motor. A driving speed of the tractor 10 can be set and/or adjusted with the tractor control unit 60. The tractor 10 can comprise a tractor frame 18, in particular can be carried on the tractor frame 18. The tractor frame 18 can be carried on ground engagement means. The ground engagement means, illustrated here in the form of front wheels 20 and rear wheels 22, are in engagement with an underlying surface in order to transmit driving forces, and/or by way of which the tractor 10 is supported on the underlying surface. The ground engagement means, in particular the front wheels 20 and rear wheels 22, can be steerable and/or movable. The tractor 10 can also comprise a cab 24. The cab 24 can be carried by the tractor frame 18. In addition, an operator's workstation can be situated in the cab 24. The tractor 10 comprises a front axle 28 and a rear axle 30. The rear axle 30 can be permanently driven, and the front axle 28 can be activated on demand or be permanently driven. The front axle 28 and/or in particular the rear axle 30 can be steerable. The tractor 10 can also comprise, for example, an accelerator pedal 16 or a hand throttle lever, not shown. Directional details, such as front and rear, left and right, refer below to the forwards direction 300 of the tractor 10, which forwards direction goes to the left in FIG. 1.

The baler 12 is connected, and/or in particular coupled, to the tractor 10. For example, the baler 12 can be coupled by a drawbar 14 of the baler 12 to a hitch 15 of the tractor 10. The baler 12 comprises a pick-up unit 126 for picking up crop, a baling chamber 112 in order to compress the picked-up crop to form a bale, a bale sensor 144 in order to sense the size of a bale in the baling chamber 112, and a baler control unit 110 which is connected to the bale sensor 144 and to the tractor control unit 60. The baler 12 can comprise a baler frame 114. The baler frame 114 can be carried on wheels 116. The baling chamber 112 can be arranged at or on the baler frame 114, preferably connected to the latter and/or fastened to the latter and/or carried thereon.

While the tractor control unit is generally described herein as a singular device, it should be appreciated that the tractor control unit may include multiple devices linked together to share and/or communicate information therebetween. Furthermore, it should be appreciated that the tractor control unit may be located on the tractor or located remotely from the tractor.

The tractor control unit may alternatively be referred to as a computing device, a computer, a controller, a control unit, a control module, a module, etc. The tractor control unit includes a processor, a memory, and all software, hardware, algorithms, connections, sensors, etc., necessary to manage and control the operation of the tractor. As such, a method may be embodied as a program or algorithm operable on the tractor control unit. It should be appreciated that the tractor control unit may include any device capable of analyzing data from various sensors, comparing data, making decisions, and executing the required tasks.

As used herein, "tractor control unit" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the tractor control unit may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The tractor control unit may be in communication with other components on the tractor and/or baler, such as hydraulic components, electrical components, and operator inputs within an operator station of an associated work vehicle. The tractor control unit may be electrically connected to these other components by a wiring harness such that messages, commands, and electrical power may be transmitted between the tractor control unit and the other components. Although the tractor control unit is referenced in the singular, in alternative embodiments the configuration and functionality described herein can be split across multiple devices using techniques known to a person of ordinary skill in the art.

The tractor control unit may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. The memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The tractor control unit includes the tangible, non-transitory memory on which are recorded computer-executable instructions, including a tractor control algorithm. The processor of the tractor control unit is configured for executing the tractor control algorithm. The tractor control algorithm at least partially implements a method of operating the combination of the tractor and the baler described herein.

The baler 12 is designed with a size-variable baling chamber 112 or as a baler 12 with a variable baling chamber 112. The compression means 118 is designed as a band or belt. The compression means surrounds the baling chamber 112 and is guided by rollers 120. However, the baler can also comprise a size-invariable baling chamber. In this case, the compression means can be designed as one or more compression rollers, in particular a multiplicity of compression rollers running parallel to one another, for compressing the crop.

The pick-up unit 126, in particular in the form of a pick-up, is arranged on the baler 12, in particular below the front edge of the baler 12. The pick-up unit 126 can comprise tines moving or rotating about a transverse axis. The pick-up unit 126 can be followed in a crop flow direction by a conveyor belt 128 of the baler 12. The conveyor belt 128 could also be replaced by a rotor (not shown), or a rotor could be inserted in the crop flow direction between the pick-up unit 126 and the conveyor belt 128. Instead of the pick-up unit 126, in particular the pick-up, other suitable crop pick-up means, such as mowing and conveying units, could also be used.

The pick-up unit 126 collects crop lying on the field in a swath 130 of grass, hay or straw, and feeds said crop to the baling chamber 112. The compression means 118, in particular one or more bands or straps, can be set into movement in the longitudinal direction during a baling operation by one or more of the rollers 120 being rotatingly driven. The crop introduced into the baling chamber 112 therefore also rotates during the compression. During the compression operation, the size of the baling chamber 112 increases over time.

The baler 12 can comprise a discharge flap 132. The discharge flap 132 can be arranged pivotably on the baler 12, in particular on the baler frame 114 or on a housing part, preferably connected thereto and/or fastened thereto and/or carried thereon. The discharge flap 132 can be pivotable about an axis 134 which extends transversely to the forwards direction of the tractor 10 and of the baler 12.

A first actuator 138 in the form of a hydraulic cylinder can be connected at one end to the baler frame 114 and at a second end to the discharge flap 132, in particular fastened thereto and/or mounted thereon. The first actuator 138 can be connected to the discharge flap 132 in such a manner that it can pivot the discharge flap 132 upwards about the axis 134 (anticlockwise in FIG. 1) in order to be able to discharge a bale from the baling chamber 112. The discharge flaps 132 can therefore be opened or closed or raised and lowered with the first actuator 138. The first actuator 138 can be set and/or adjusted, in particular controlled and regulated, with the baler control unit 110, for example via an electromagnetic valve arrangement. The electromagnetic valve arrangement can be set and/or adjusted, in particular controlled and regulated, with the baler control unit 110. A discharge flap sensor 157 can sense, for example, the position of the first actuator 138 or of the discharge flap 132.

The baler 12 comprises the baler control unit 110. The baler control unit 110 is connected to the bale sensor 144 and to the tractor control unit 60, preferably in signal-exchanging fashion and/or signal-transmitting fashion and/or data-conducting fashion. The baler control unit 110 can be connected to the tractor control unit 60 and/or to the bale sensor 144, for example, by means of a cable, in particular with a releasable plug, or via a radio connection. The plug can be connected to a plug socket on the rear side of the tractor 10, in particular of the tractor frame 18. The bale sensor 144 which is connected to the baler control unit 110 can be arranged on or in the baling chamber 112, in particular fastened in the latter. The bale sensor 144 can sense, for example, the distance from the bale surface or from the compression means 118 lying on the bale surface, and can thus provide information about the size of the bale, in particular the bale diameter. The size of the bale sensed by the bale sensor 144 or the bale shape can be permanently displayed to the operator on an input and output unit 74.

While the baler control unit is generally described herein as a singular device, it should be appreciated that the baler control unit may include multiple devices linked together to share and/or communicate information therebetween. Furthermore, it should be appreciated that the baler control unit may be located on the baler implement or located remotely from the baler implement, such as on the tractor.

The baler control unit may alternatively be referred to as a computing device, a computer, a controller, a control unit, a control module, a module, etc. The baler control unit includes a processor, a memory, and all software, hardware, algorithms, connections, sensors, etc., necessary to manage and control the operation of the baler. As such, a method may be embodied as a program or algorithm operable on the baler control unit. It should be appreciated that the baler control unit may include any device capable of analyzing data from various sensors, comparing data, making decisions, and executing the required tasks.

As used herein, "baler control unit" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the baler control unit may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The baler control unit may be in communication with other components on the baler implement and/or the tractor, such as hydraulic components, electrical components, and operator inputs within an operator station of an associated work vehicle. The baler control unit may be electrically connected to these other components by a wiring harness such that messages, commands, and electrical power may be transmitted between the baler control unit and the other components. Although the baler control unit is referenced in the singular, in alternative embodiments the configuration and functionality described herein can be split across multiple devices using techniques known to a person of ordinary skill in the art.

The baler control unit may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. The memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The baler control unit includes the tangible, non-transitory memory on which are recorded computer-executable instructions, including a baler control algorithm. The processor of the baler control unit is configured for executing the baler control algorithm. The baler control algorithm at least partially implements a method of operating the combination of the tractor and the baler, described herein.

A wrapping device 146 is arranged on, in particular in the vicinity of, the baling chamber 112. The wrapping device 146 is connected to the baler control unit 110 and, as soon as it is instructed in this regard by the baler control unit 110, dispenses a wrapping material, such as twine, a band, mesh or a packaging sheet, to the baling chamber 112. The rotating bale traps or pulls the wrapping material such that it is then wrapped around the bale. A wrapping sensor 148 can interact with the wrapping device 146 and sense whether the bale is pulling on the packaging.

The pick-up unit 126 can be raised and lowered, for example, with a second actuator 152, here in the form of a hydraulic cylinder. The second actuator 152 can be set and/or adjusted, in particular controlled and regulated, with the baler control unit 110, for example via a further electromagnetic valve arrangement. The further electromagnetic valve arrangement can be set and/or adjusted, in particular controlled and regulated, with the baler control unit 110.

A swath sensor 160, here in the form of a camera which is directed towards the swath 130, can be mounted on the tractor 10, in particular on the front side of the tractor 10. The camera supplies a video signal to the tractor control unit 60, which video signal can be processed in an image processing system. The image processing system can be designed in particular as part of the tractor control unit 60 in order to provide electronic information about the position of the tractor 10 with respect to the swath 130.

The combination 1, in particular the tractor, can also comprise a GPS device 32, wherein position data can be sent and/or can be received, and/or in particular can be calculated, with the GPS device 32. The GPS device 32 can comprise, for example, a GPS antenna receiving position data, and a memory. The position of the swath 130 that is known from earlier working operations can be stored in the memory. The tractor 10 could then be steered in such a manner that the actual position of the combination 1 or of the tractor 10, which is supplied from the GPS antenna, and the position of the swath 130 from the memory coincide. Steering data could also be calculated by the baler control unit 110 or by a separate steering control unit, not shown. The tractor 10 can also be steerable with the tractor control unit 60. For this purpose, for example, the tractor control unit 60 can be designed as a steering control unit. Specifically, the combination 1, in particular the tractor 10, can also be connected via an electromagnetic valve arrangement to a steering cylinder which sets and/or adjusts, in particular controls and regulates, the steering angle of the front axle 28 and/or of the front wheels 20.

The baler control unit 110 can be operated in such a manner that the baler control unit 110 sends a stop signal to the tractor control unit 60 when the bale signal of the bale sensor 144 indicates that a bale has reached a size which is greater than or equal to a first predetermined size. Specifically, the baler control unit 110 can thus be operated in the following manner. The baler control unit 110 receives the bale signal from the bale sensor 144. The baler control unit 110 calculates and/or checks by way of the bale signal whether a bale has reached a size which is greater than or equal to the first predetermined size. When the baler control unit 110 establishes that the bale has reached a size which is greater than or equal to the first predetermined size, the baler control unit 110 sends a stop signal to the tractor control unit 60. The tractor control unit 60 can be operated to instruct the tractor 10 to initiate a braking operation for stopping the tractor 10 and to adapt a driving rotational speed of the drive shaft 56 of the baler 12 when the tractor control unit 60 receives the stop signal from the baler control unit 110.

Figure 2:
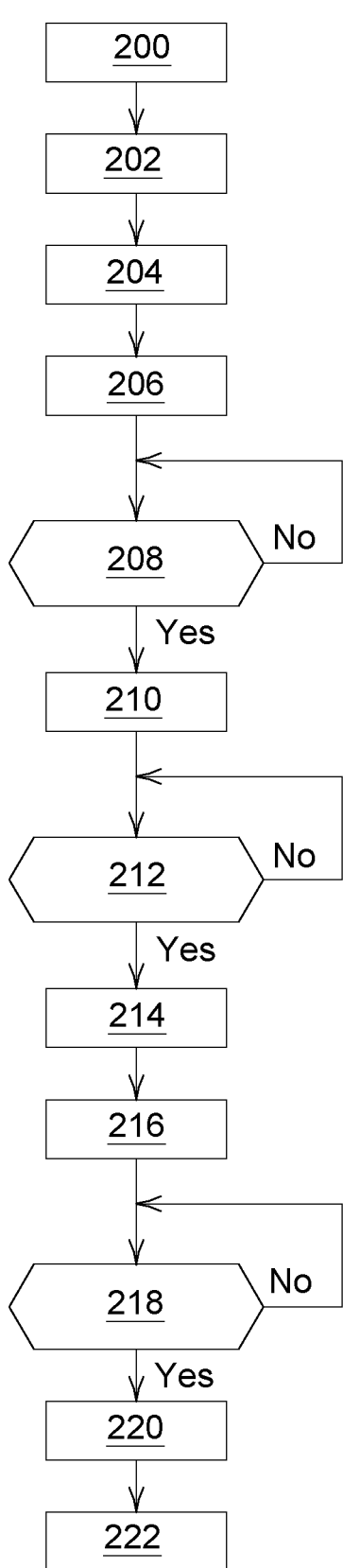
FIG. 2 is a schematic flow diagram which shows how the combination according to the disclosure can be operated.

FIG. 2 shows a schematic flow diagram of how the combination 1 according to the disclosure, in particular the combination shown in FIG. 1, can be operated. Only details not shown in FIG. 1 will therefore be discussed below. The operation shown in FIG. 2 can in particular be carried out with the combination 1 shown in FIG. 1. After the start in step 200, the tractor control unit 60 and the baler control unit 110 can be initiated in an optional step 202, i.e., for example, suitable software can be loaded into their memories in step 202. In optional step 204, the drive motor 36 can be started, for example by the operator turning an ignition key or depressing a certain key. A desired driving speed can then be set in an optional step 206. In a preferred embodiment, the driving speed of the tractor 10 can be predetermined, for example, first of all by the accelerator pedal 16 or the hand throttle lever, not shown. In an optional step 208, the baler control unit 110 can receive and evaluate the bale signal of the bale sensor 144. For this purpose, the baler control unit 110 can ascertain, in particular calculate, whether a bale has reached a size which is greater than or equal to a second predetermined size. The second predetermined size can in particular be smaller (e.g. 10 cm in diameter smaller) than the first predetermined size. The first predetermined size, which corresponds to a desired bale size, and/or the second predetermined size can be input by the operator by means of the input and output unit 74. If the second predetermined size has not been reached, step 208 can be carried out again.

If, on the other hand, the size of the bale is equal to or greater than the second predetermined size, step 210 is carried out. In step 210, the baler control unit 110 can be operable in such a manner or is operated in such a manner that the baler control unit 110 sends a deceleration signal to the tractor control unit 60. The tractor control unit 60 in turn can be operated or is operated to slow down the tractor if the tractor control unit 60 receives the deceleration signal from the baler control unit 110. The tractor can be driven at a slower driving speed, for example 4 km/h.

In the following optional step 212, the baler control unit 110 can receive and evaluate the bale signal of the bale sensor 144. For this purpose, the baler control unit 110 can ascertain, in particular calculate, whether a bale has reached a size which is greater than or equal to the first predetermined size. If the first predetermined size of the bale has not been reached, step 208 and/or step 212 can be carried out again.

If the bale signal of the bale sensor 144 indicates that a bale has reached a size which is greater than or equal to a first predetermined size, then step 214 is carried out. In step 214, the tractor control unit 60 can be operated or is operated to instruct the tractor 10 to initiate a braking operation for stopping the tractor 10 and to adapt a driving rotational speed of the drive shaft 56 of the baler when the tractor control unit 60 receives the stop signal from the baler control unit 110. The operation, provided in step 214, of the tractor control unit 60 to instruct the tractor 10 to initiate a braking operation for stopping the tractor can also optionally take place in steps 216 and/or 218.

If, in turn, the driving rotational speed of the drive shaft 56 of the baler is adapted, step 216, in which the baler control unit 110 instructs the wrapping device 146 to dispense wrapping material onto the bale, can optionally be carried out. Adapting the driving rotational speed of the drive shaft 56 can be understood as meaning increasing or reducing the driving rotational speed. If necessary or useful, the pick-up unit 126 can be raised by the second actuator 152 upon command from the baler control unit 110 before the wrapping device 146 is actuated.

This is followed by the optional step 218 in which the baler control unit 110 checks on the basis of the signals supplied by the wrapping sensor 148 whether the bale has sensed and is therefore pulling the wrapping material. If this is incorrect, step 218 is carried out again. This is followed by step 220 in which the winding operation is carried out and its end is awaited. An error signal can be sent from the baler controller 110 to the input and output unit 74 if the wrapping sensor does not send a signal to the baler control unit 110. Subsequently, the wrapped bale is discharged in step 222.

Figure 3:
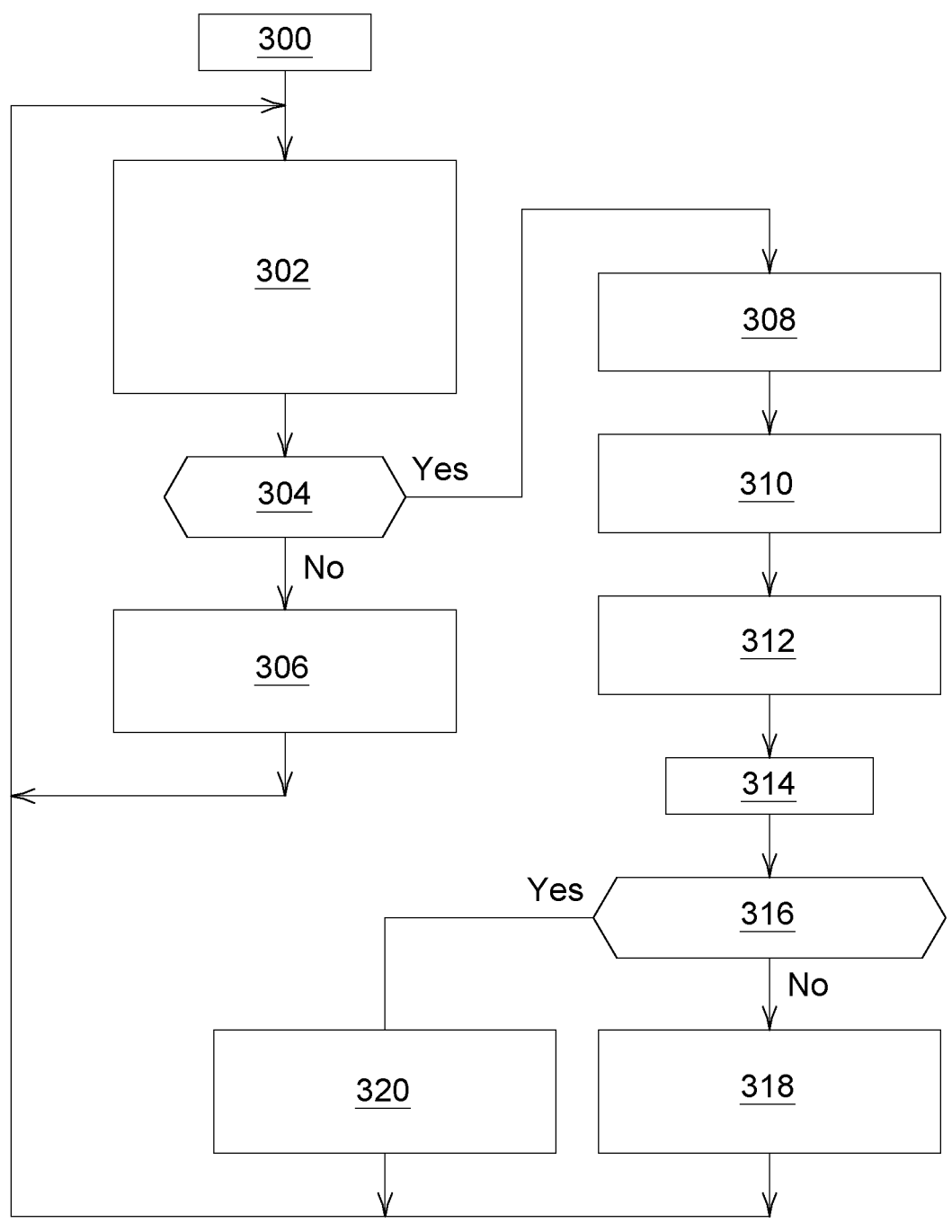
FIG. 3 is a schematic flow diagram which further shows how the combination according to the disclosure can be operated.

In order to make the work for the operator even simpler, a second aspect of the present disclosure is directed towards an automatic steering mode of the tractor 10 during the baling operation. The described steering operation additionally attempts to obtain an exactly cylindrical shape of the bale. In FIG. 3, a flow diagram schematically shows how the combination 1 according to the disclosure, in particular the combination shown in FIGS. 1 and 2, can be operated, in particular steered. Only details not shown in FIG. 1 will therefore be discussed below. The operation shown in FIG. 3 can take place in particular with the combination 1 shown in FIG. 1 and in combination with the operation shown in FIG. 2.

The steering operation is carried out by the tractor control unit 60 using the signal of the swath sensor 160, in particular the video signal from the camera, and in particular the bale signal of the bale sensor 144, which signals are supplied to the tractor control unit 60 by the baler control unit 110. It would also be possible to provide at least the function of converting the bale signal of the bale sensor 144 into a bale forming signal by the tractor control unit 60 instead of by the baler control unit 110, e.g. by directly connecting the bale sensor 144 to the tractor control unit 60. The camera could also be replaced or complemented, for example, by two swath position sensors which, independently of each other, sense the position of the borders of the swath 130, said swath position sensors being installed on each side of the tractor 10. In one embodiment, the swath position sensors can be fitted below the tractor sides and can measure the lateral distance from the vertical flanges of the swath, for example using ultrasound.

After the starting of the steering operation in step 300, in step 302, using the camera signals processed in an image processing system, the width W of the swath and the offset D of the centre axis of the swath from the centre axis of the tractor 10 can be calculated. The calculation can be undertaken with the image processing system which is designed as part of the tractor controller 60. Equally, however, the image processing system can be designed as part of the GPS device 32 and the calculation can be undertaken by the GPS device.

In step 304, it is checked whether the width W of the swath 130 is smaller than the width Wb of the baling chamber 112. If this is not the case, i.e. the baler has the same width as the swath or is even smaller, in step 306 the tractor is steered to the left or right depending on the offset D in order to remain centred on the swath 130. Step 302 follows step 306.

If, on the other hand, according to step 304, the width W of the swath 130 is smaller than the width Wb of the baling chamber 112, step 308 is carried out. In step 308, a value $\Delta$width is calculated which corresponds to the absolute value of the difference between the width Wb of the baling chamber 112 and the width W of the swath 130.

In step 310, the tractor control unit 60 receives the bale signal of the bale sensor 144 from the baler control unit 110. Information regarding a bale shape deviation $\Delta$S from a cylindrical shape is calculated in step 312 by, for example, the values of different measurements of the size of the bale or values of the size of the bale that have been sensed simultaneously by a plurality of bale sensors 144 being subtracted from one another.

If the absolute value of the bale shape deviation $\Delta$S is not greater than a predetermined threshold value, which is checked in step 314, step 316 is carried out. In step 316, the tractor 10, in particular the steering cylinder, can be set and/or adjusted, in particular controlled and regulated, in such a manner that the offset D is greater than $\Delta$width/2−x cm and smaller than $\Delta$width/2+x cm, where 1 cm≤x≤15 cm, preferably 3 cm≤x≤8 cm, particularly preferably x=5 cm. Of course, the boundary limits of the offset D can also be precisely coordinated taking into consideration the width of the pick-up unit. Since D is positive, the tractor 10 is steered to the left side of the swath 130. In one example, if W=70 cm, Wb=120 cm, width would be 50 cm, and therefore the tractor control unit 60 would attempt to get to D of between 20 and 30 cm, i.e. would steer the tractor to the left such that the swath 130 is offset to the right by 20 to 30 cm from a longitudinal axis of the tractor 10.

If, on the other hand, in step 314, the bale shape deviation is greater than the predetermined threshold value, step 318 is carried out, according to which the tractor 10, in particular the steering cylinder, is controlled in such a manner that the offset −D is greater than $\Delta$width/2−x cm and is smaller than $\Delta$width/2+x cm, where 1 cm≤x≤15 cm, preferably 3 cm≤x≤8 cm, particularly preferably x=5 cm. The tractor 10 is now steered to the right such that it passes onto the left side of the swath since D is negative. With the numbers from the above example, the tractor 10 would be steered 20 to 30 cm to the right side of the swath 130. After steps 316 and 318, step 302 is carried out again.

The tractor is therefore steered in relatively large curves along the swath 130 such that the swath 130 enters alternately in the vicinity of the left and right ends of the pick-up unit 126 in order to obtain a cylindrical bale shape, but no crop remains on the field.

The hauler controller 60 could also check whether the swath 130 is curved and, if this is the case, could correspondingly adapt the offset D by positive values being increased and negative values being reduced when a turn made to the right and, the other way around, when a turn is made to the left. If the tractor control unit 60 has not been able to calculate satisfactory information about the swath 130, the operator could be warned acoustically and/or via a message shown on the input and output unit 74 that he must perform the steering himself, and preferably the tractor 10 would also automatically stop unless the driver takes over the steering. Each significant action on a steering wheel of the tractor 10 would also deactivate the automatic steering function.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler system comprising:
   a combination of a tractor and a baler connected to the tractor;
   wherein the tractor includes a drive motor which is connected to a drive shaft of the baler, and a tractor controller, wherein a driving speed of the tractor is controllable with the tractor controller;
   wherein the baler includes a pick-up for picking up crop, a baling chamber for compressing the picked-up crop to form a bale, a bale sensor operable to sense the size of the bale in the baling chamber, and a baler controller connected to the bale sensor and to the tractor controller;

wherein the baler controller is operable to send a stop signal to the tractor controller when the bale signal of the bale sensor indicates that a bale has reached a size which is greater than or equal to a first predetermined size; and wherein the tractor controller is operable to initiate a braking operation for stopping the tractor and to adapt a driving rotational speed of the drive shaft of the baler when the tractor controller receives the stop signal from the baler controller.

2. The baler system set forth in claim 1, wherein the tractor controller is operable to initiate an increase or reduction in the driving rotational speed of the drive shaft of the baler when the tractor controller receives the stop signal from the baler controller.

3. The baler system set forth in claim 1, wherein the tractor is steerable with the tractor controller.

4. The baler system set forth in claim 1, further comprising a swath sensor operable to generate a swath signal indicating limits of a swath of crop, and wherein the tractor controller is operable to steer the tractor along the swath on the basis of the swath signal from the swath sensor.

5. The baler system set forth in claim 1, wherein the baler controller is operable to send a deceleration signal to the tractor controller when the baler controller receives a bale signal from the bale sensor that a bale has reached a size which is greater than or equal to a second predetermined size which is smaller than the first predetermined size, and the tractor controller is operable to slow down the tractor when the tractor controller receives the deceleration signal from the baler controller.

6. The baler system set forth in claim 1, wherein the baler comprises a wrapping device for wrapping the finished bale with wrapping material in the baling chamber.

7. The baler system set forth in claim 1, wherein the tractor controller is operable to drive the combination at a speed which produces a predetermined throughput of crop material through the pick-up of the baler.

8. The baler system set forth in claim 1, wherein the combination includes a GPS device operable to send and receive position data.

9. The baler system set forth in claim 1, wherein the baler controller includes a processor and a memory having a baler control algorithm stored thereon, wherein the processor of the baler controller is operable to execute the baler control algorithm to generate the stop signal in response to the bale signal from the bale sensor indicating the size of the bale is greater than the first predetermined size.

10. The baler system set forth in claim 1, wherein the tractor controller includes a processor and a memory having a tractor control algorithm stored thereon, wherein the processor of the tractor controller is operable to execute the tractor control algorithm to control the speed of the tractor and the rotational speed of the drive shaft of the baler in response to the stop signal from the baler controller.

11. A method of operating a combination of a tractor and a baler connected to the tractor, wherein the tractor includes a drive motor connected to a drive shaft of the baler, and a tractor controller operable to control a driving speed of the tractor and a rotational speed of the drive shaft of the baler, wherein the baler includes a pick-up for picking up crop, a baling chamber in which the picked-up crop is compressed to form a bale, a bale sensor with which the size of a bale in the baling chamber is sensed, and a baler controller connected to the bale sensor and to the tractor controller, the method comprising:

sensing a diametric size of the bale in the baling chamber with the bale sensor and sending a bale signal to the baler controller indicative thereof;

sending a stop signal from the baler controller to the tractor controller when the bale signal of the bale sensor indicates that the size of the bale is greater than a first predetermined size; and initiating a braking operation with the tractor controller for stopping the tractor and adapting a driving rotational speed of the drive shaft of the baler when the tractor controller receives the stop signal from the baler controller.

* * * * *